(12) United States Patent
Rockett

(10) Patent No.: US 12,234,187 B2
(45) Date of Patent: Feb. 25, 2025

(54) LIGHTWEIGHT STRUCTURAL CONCRETE BLOCK AND METHODS OF USE

(71) Applicant: Bart Rockett, Marlton, NJ (US)

(72) Inventor: Bart Rockett, Marlton, NJ (US)

( * ) Notice: Subject to any disclaimer, the term of this patent is extended or adjusted under 35 U.S.C. 154(b) by 317 days.

(21) Appl. No.: 17/683,801

(22) Filed: Mar. 1, 2022

(65) Prior Publication Data
US 2022/0289629 A1    Sep. 15, 2022

Related U.S. Application Data

(60) Provisional application No. 63/158,591, filed on Mar. 9, 2021.

(51) Int. Cl.
| | | |
|---|---|---|
| *C04B 18/02* | (2006.01) | |
| *B28B 11/08* | (2006.01) | |
| *B28B 11/24* | (2006.01) | |
| *B28B 23/00* | (2006.01) | |
| *C04B 7/32* | (2006.01) | |
| *C04B 18/20* | (2006.01) | |
| *C04B 22/02* | (2006.01) | |

(Continued)

(52) U.S. Cl.
CPC ........ *C04B 18/027* (2013.01); *B28B 11/0845* (2013.01); *B28B 11/24* (2013.01); *B28B 23/0087* (2013.01); *C04B 7/323* (2013.01); *C04B 18/20* (2013.01); *C04B 22/02* (2013.01); *C04B 28/065* (2013.01); *C04B 41/4884* (2013.01); *C04B 2103/44* (2013.01); *C04B 2111/00939* (2013.01); *C04B 2111/40* (2013.01); *C04B 2111/70* (2013.01); *C04B 2201/20* (2013.01)

(58) Field of Classification Search
CPC .......... B29C 2045/179; B29C 66/7463; B29C 67/242
See application file for complete search history.

(56) References Cited

U.S. PATENT DOCUMENTS

| | | |
|---|---|---|
| 5,702,651 A | 12/1997 | Bean et al. |
| 6,616,752 B1 | 9/2003 | Basura et al. |

(Continued)

OTHER PUBLICATIONS

Almeshal, I. et al.: "Eco-friendly concrete containing recycled plastic as partial replacement for sand," *Journal of Materials Research and Technology*, vol. 9(3), 2020, pp. 4631-4643.

(Continued)

*Primary Examiner* — Stella K Yi
(74) *Attorney, Agent, or Firm* — DLA Piper LLP (US)

(57) ABSTRACT

A method of forming a lightweight concrete block and the resulting structure. Calcium sulfoaluminate (CSA) cement and specialized grout maybe added to an amount of water in a mixer. The CSA cement, specialized grout, and water may be blended to a smooth consistency. Lightweight aggregates (LWA) maybe added to form a mixture. The mixture may be poured into a mold, allowed the mixture to cure, and removed from the mold to form the lightweight concrete block. The lightweight concrete block may have a first side and a second side joined by a plurality of interposing walls, the interposing walls defining one or more inner cavities and one or more outer cavities. The lightweight concrete block may have features that allow for the insertion of fiberglass rebar to aide in stacking and filling to form a wall.

19 Claims, 11 Drawing Sheets

(51) Int. Cl.
*C04B 28/06* (2006.01)
*C04B 41/48* (2006.01)
*C04B 103/44* (2006.01)
*C04B 111/00* (2006.01)
*C04B 111/40* (2006.01)
*C04B 111/70* (2006.01)

(56) References Cited

U.S. PATENT DOCUMENTS

| | | |
|---|---|---|
| 7,695,560 B1 | 4/2010 | Buarque de Macedo |
| 8,110,040 B2 | 2/2012 | Bui |
| 8,519,016 B2 | 8/2013 | Perez-Pena |
| 10,308,553 B2 | 6/2019 | Maslehuddin et al. |
| 2002/0108338 A1 | 8/2002 | Barnett et al. |
| 2014/0087158 A1 | 3/2014 | Ciuperca |
| 2016/0185665 A1* | 6/2016 | Al-Aqeeli ............... C04B 26/02 524/2 |
| 2020/0199014 A1 | 6/2020 | Filshill et al. |
| 2020/0217086 A1 | 7/2020 | Hofele |
| 2020/0261951 A1 | 8/2020 | Filshill et al. |
| 2022/0402817 A1 | 12/2022 | Polak et al. |

OTHER PUBLICATIONS

Official Action dated Aug. 23, 2024, of corresponding U.S. Appl. No. 17/683,723.
Park et al., "Hydration characteristics of calcium sulfoaluminate (CSA) cement/Portland cement blended pastes," Journal of Building Engineering 34 (2021) 101880. (Year: 2021).
Office Action dated May 6, 2024, of related U.S. Appl. No. 17/683,913.

* cited by examiner

LIGHTWEIGHT STRUCTUAL CONCRETE BLOCK AND METHODS OF USE

CROSS REFERENCE TO RELATED APPLICATIONS

This application claims the benefit of U.S. Provisional Application No. 63/158,591 entitled "LIGHTWEIGHT STRUCTURAL CONCRETE FROM RECYCLED MATERIALS" and filed on Mar. 9, 2021. The entire contents of this application are hereby incorporated by reference.

TECHNICAL FIELD

The present disclosure generally relates to concrete products, and more particularly to a concrete block made of structural insulative lightweight concrete composed of recycled materials.

BACKGROUND

A concrete block is primarily used as a building material in the construction of walls. It is sometimes called a concrete masonry unit (CMU). A concrete block is one of several precast concrete products used in construction. The term precast refers to the fact that the blocks are formed and hardened before they are brought to the job site. Most concrete blocks have one or more hollow cavities, and their sides may be cast smooth or with a design. In use, concrete blocks are stacked one at a time and held together with fresh concrete mortar to form the desired length and height of the wall.

SUMMARY

A method of forming a lightweight concrete block and the resulting structure. Calcium sulfoaluminate (CSA) cement and specialized grout maybe added to an amount of water in a mixer. The CSA cement, specialized grout, and water may be blended to a smooth consistency. Lightweight aggregates (LWA) maybe added to form a mixture. The mixture may be poured into a mold, allowed the mixture to cure, and removed from the mold to form the lightweight concrete block. The lightweight concrete block may have a first side and a second side joined by a plurality of interposing walls, the interposing walls defining one or more inner cavities and one or more outer cavities. The lightweight concrete block may have features that allow for the insertion of fiberglass rebar to aide in stacking and filling to form a wall.

BRIEF DESCRIPTION OF THE DRAWINGS

The drawings described below are for illustration purposes only. The drawings are not intended to limit the scope of the present disclosure.

DETAILED DESCRIPTION

Figure 1:
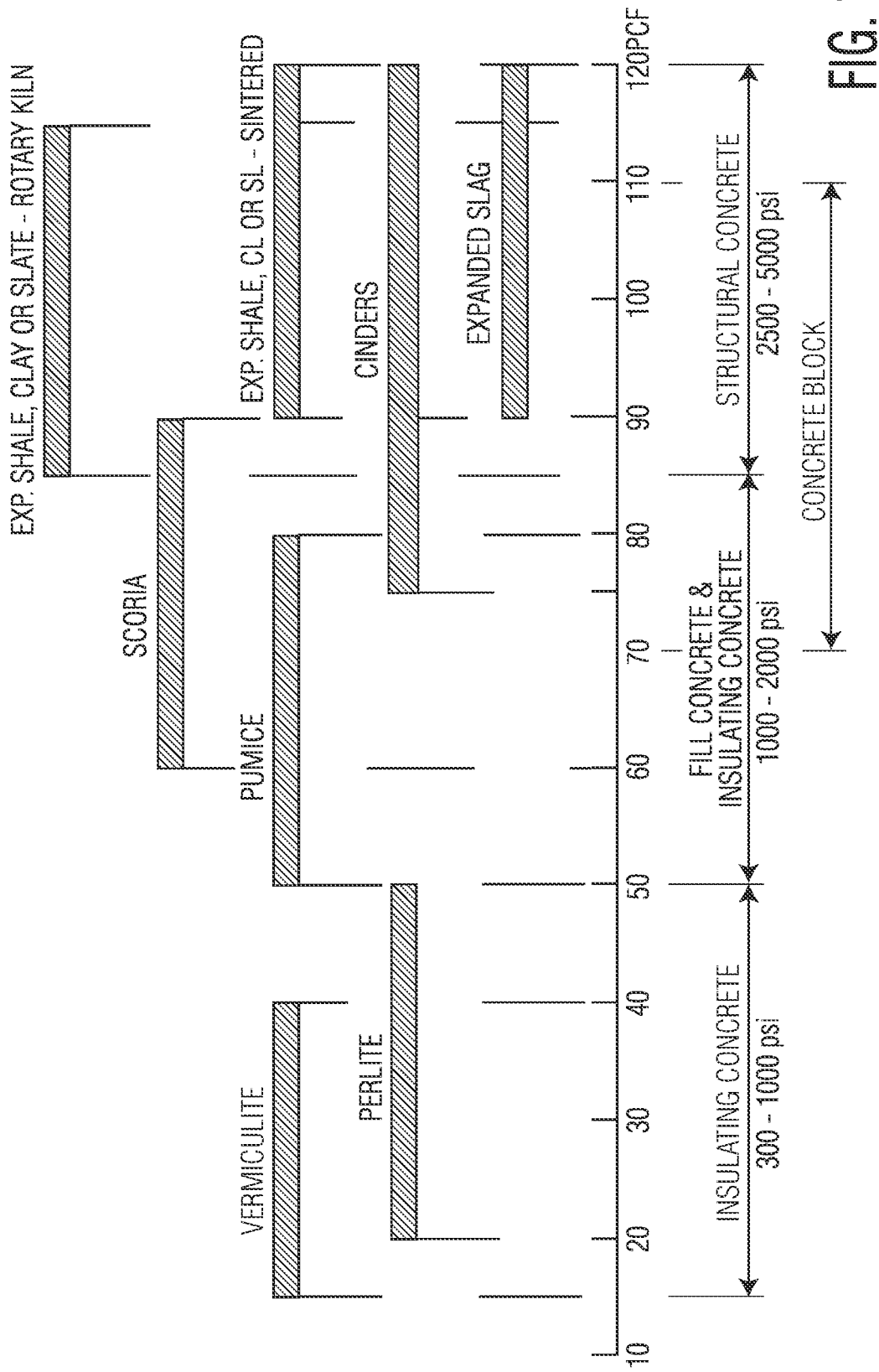
FIG. 1 is a diagram illustrating various available lightweight aggregate concrete mixes ranging from non-structural to structural strength.

Standard concrete masonry blocks are typically precast and made from cast concrete consisting of coarse aggregate (stone), fine aggregate (sand), and cement binder. The concrete commonly used to make concrete blocks is a mixture of powdered Portland cement, water, sand, and gravel. This produces a light gray block with a fine surface texture and a high compressive strength. A typical concrete block weighs 38-43 lb (17.2-19.5 kg). In general, the concrete mixture used for blocks has a higher percentage of sand and a lower percentage of gravel and water than the concrete mixtures used for general construction purposes. This produces a very dry, stiff mixture that holds its shape when it is removed from the block mold.

If granulated coal or volcanic cinders are used instead of sand and gravel, the resulting block is commonly called a cinder block. This produces a dark gray block with a medium-to-coarse surface texture, good strength, good sound-deadening properties, and a higher thermal insulating value than a concrete block. A typical cinder block weighs 26-33 lb (11.8-15.0 kg).

Lightweight concrete blocks are typically made by replacing the sand and gravel with expanded clay, shale, or slate. Expanded clay, shale, and slate are produced by crushing the raw materials and heating them to about 2000° F. (1093° C.). At this temperature the material bloats, or puffs up, because of the rapid generation of gases caused by the combustion of small quantities of organic material trapped inside. A typical light-weight block weighs 22-28 lb (10.0-12.7 kg) and is used to build non-load-bearing walls and partitions. Expanded blast furnace slag, as well as natural volcanic materials such as pumice and scoria, are also used to make lightweight blocks.

Several approaches in the art have been employed to form aerated, lightweight concrete building units that are suitable for building purposes. In order for the lightweight concrete building units to be suitable for building purposes, they must have sufficient structural integrity (e.g., compressive strength) to meet building code requirements and they should be uniform in size and shape to be practical for use in the construction industry. In addition, the building units must be manufacturable in an efficient enough manner and in sufficient quantities to support demands required by the building construction industry. As such, one method known in the art of producing individual blocks is to form larger blocks of lightweight concrete and then cut the larger blocks into smaller building units while the cement is still in a partially cured or "green" state.

When employing cutting methods to form smaller building units, whether the initial larger block is formed by using alumina powder to cause the cement mixture to "rise" or the initial block is formed by forming a foamed cement slurry by adding a stable foam to the mixture, the resultant cement slurry is poured into a large mold and allowed to at least partially cure into a relatively large block. For cement slurries that "rise," the height of the block within the mold is dependent upon the amount of aeration or gas generation that occurs within the cement mixture and the amount of gas that is entrained within the cement mixture when the mixture begins to harden. For cement slurries to which a stable foam has been added prior to being poured into a mold, the height of the block in the mold is determined by the amount of pre-foamed cement slurry poured into the mold and the amount of air that escapes from the cement slurry before the viscosity of the cement slurry increases to a point where the air cells can no longer migrate within the mixture. Once the cement has hardened or cured to a degree where the formed block can be handled, the block may be removed from the mold and cut into smaller blocks of a desired size and shape. Because the height of the initially formed block is somewhat unpredictable, there is often significant amounts of scrap material produced during such block forming processes.

When casting aerated cement compositions, it is common to find that the density of the block formed varies from top to bottom. That is, prior to solidification of the cement slurry, the gas cells migrate to the top of the block resulting in a block that has a greater density nearer the bottom of the block. Accordingly, individual building units that are cut from a larger block will vary in density resulting in blocks of varying structural strength and weight.

Currently, the use of structural lightweight concrete has been limited to large cast structures where its lower density is required, such as bridges and high rises. Like most normal concrete materials, its utilization in residential buildings has been limited due to its inflexibility, material cost, and associated labor cost in handling the material. Thus, an economical lightweight concrete block with structural strength and insulating and water resistant properties would be very valuable because it could overcome the limitations of traditional concrete masonry blocks and lightweight structural concrete now used in building applications.

Other methods for forming individual building units include individual casting in a mold. Such methods for forming individual building units are typically not very efficient at producing large quantities of building units in a relatively short period of time. As such, the cost per unit is relatively high compared to conventional construction materials resulting in products that have not been very commercially successful. In addition, these conventional methods do not disclose blocks can be formed in a uniform manner to produce building units having substantially equal dimensions and relatively equivalent densities As such, it would be advantageous to provide a method and apparatus for forming individual lightweight concrete blocks in an efficient and cost effective manner that produces blocks having substantially uniform dimensions and relatively consistent densities.

Herein, the term "structural aggregate" is defined as aggregate that has compression strength that is greater than 2500 psi as consistent with the term "structural" referred in American Society for Testing and Materials (ASTM) standard for concrete. The term "non-structural aggregate" is defined as aggregate with compression strength of 2500 psi or less.

Referring now to FIG. 1, a diagram illustrating various available lightweight aggregate concrete mixes ranging from non-structural to structural strength. The structural mixes may contain structural lightweight aggregate, such as expanded shale, expanded slag, cinders, or expanded clay. Most lightweight concrete (structural or otherwise) falls into three (3) categories. A first category of lightweight concrete relates to the standard structural concrete that utilizes lighter aggregates, such as expanded shale or expanded clay as normal stone replacement. The size of lightweight structural aggregates varies from coarse to fine. The mechanics of standard structural concrete matrix work the same way as regular concrete, since the structural aggregates are used to carry the load directly.

Figure 2:
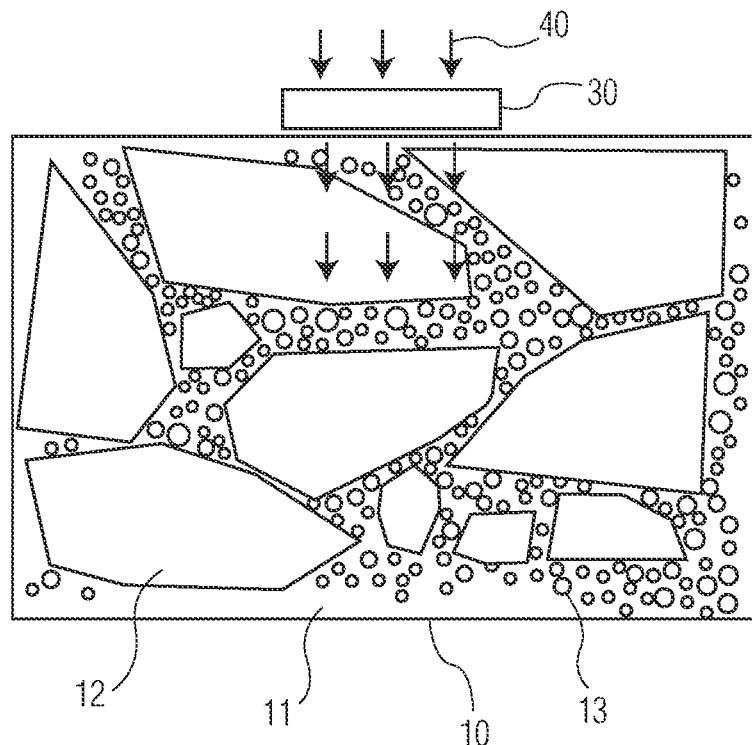
FIG. 2 is a diagram illustrating a matrix of the first category of lightweight concrete.

Referring now to FIG. 2, a diagram illustrating a matrix of the first category of lightweight concrete 10 and its mechanics is shown. The intention of this figure is to show how the concrete and structural aggregates works to carry load so as to better understand this aspect of concrete. As shown in FIG. 2, the first category of lightweight concrete 10 has coarse structural aggregates 12, fine sand aggregates 13, and a composition of cement binder and fly-ash 11. The mechanics of this matrix is straightforward. Force vectors 40 from a load starting from above a plate 30 travel a straight downward path through the structural aggregates 12 and through all materials in their path. This is because all the aggregates in this matrix have structural strength and are capable of holding up the load. The coarse aggregates 12 play an important role in providing the concrete strength.

A second category of lightweight concrete relates to a type of concrete that has no coarse aggregates with structural strength. This concrete is typically provided with fine structural fillers, such as masonry sand and air cells, expanded perlite, vermiculite, or wood particle as the larger non-structural fillers to take up space in the matrix. The concrete matrix in the second category (whether it is cellular or perlite concrete) relies solely on the solid cementitious structure (cement binder and fine structural aggregates such as sand) enveloping the air cells or the expanded perlite to carry the load. A third category of lightweight concrete relates to the type of concrete that has both structural and non-structural aggregates larger than masonry sand; the concrete matrix will have elements of both the first and second categories.

The second category of lightweight concrete is typically cellular concrete, perlite concrete, vermiculite concrete or the like. These types of lightweight concretes are often provided with non-structural strength and are limited in construction applications. Cellular and non-structural aggregate, such as expanded perlite concrete, has been limited only to a few applications that do not require structural strength, but rather take advantage of the insulating characteristics.

Past attempts to make this type of concrete into structural grade and make it more economical have resulted in failure. Such past failures are generally attributable to the lack of understanding of the concrete's matrix and its complex mechanism at the microstructure level. It is well known that a solid ordinary concrete made of fly ash, Portland cement and sand, can have compression strength of 8,000-9,000 psi. This strength is much more than the structural requirement of most applications. Therefore, it would make sense to lighten it by introducing effective voids in the concrete. However, creating void cells in the concrete matrix has not been so easy for the last few decades. Moreover, obtaining desirable properties in cellular concrete or non-structural aggregate concrete with the least amount of material and labor cost can also be a science, given that exotic materials with limited supply required for any concrete mixes or certain complex manufacturing processes will always make the concrete expensive. Therefore, in order to be cost effective, the concrete has to be made using common materials that are abundant in supply; and its manufacture process must also be simple.

Traditional approaches for large sized lightweight aggregate have included the use of materials such as perlite, expanded shale, and other naturally occurring porous rocks. Recently, research has examined sintered materials for use as a lightweight aggregate. Typically under either of these approaches, the material has an open structure, allowing it to absorb water. This can complicate the concrete forming process as the aggregate will often compete with the cement for available water. Thus, the aggregate is either soaked in water prior mixing, which can lead to excess water and less than optimal curing, or the aggregate is mixed with the cement immediately prior to use, thus necessitating the additional cost and inconvenience of mixing at or near a jobsite. Further, few small-sized lightweight aggregates have been developed. The industry still relies mainly on sand for small sized aggregates, which, while providing excellent flowability in the concrete mix prior to curing does not provide a particularly advantageous strength to weight ratio in the final product.

According to ASTM specification, a cellular concrete is a lightweight product consisting of Portland cement, cement-silica, cement-pozzolan, lime-pozzolan, lime-silica pastes or pastes containing blends of these gradients and having homogeneous void or cell structure, attained with gas-forming chemicals of foaming agents. Cellular lightweight concrete has existed since the 1930's and is produced throughout the world. It is known for its properties including thermal and sound insulation, as well as being lightweight. Traditionally, cellular lightweight concrete is made with calcium containing materials and siliceous materials. Calcium containing materials may include Portland cement, granulated blast furnace slag, and lime; siliceous materials include fly ash and ground silica.

In cellular lightweight concrete, the density can be controlled by the introduction of gas or foam. The use of cellular concrete overcomes the supply problem associated with the use of lightweight aggregates, and further allows an increased degree of control of the density of the finished product. Thus, cellular concrete can be useful in floor fill and roof deck applications, providing insulation and a high degree of fire protection. However, it is generally unsuitable as a structural material because of shrinkage and cracking.

Figure 3:
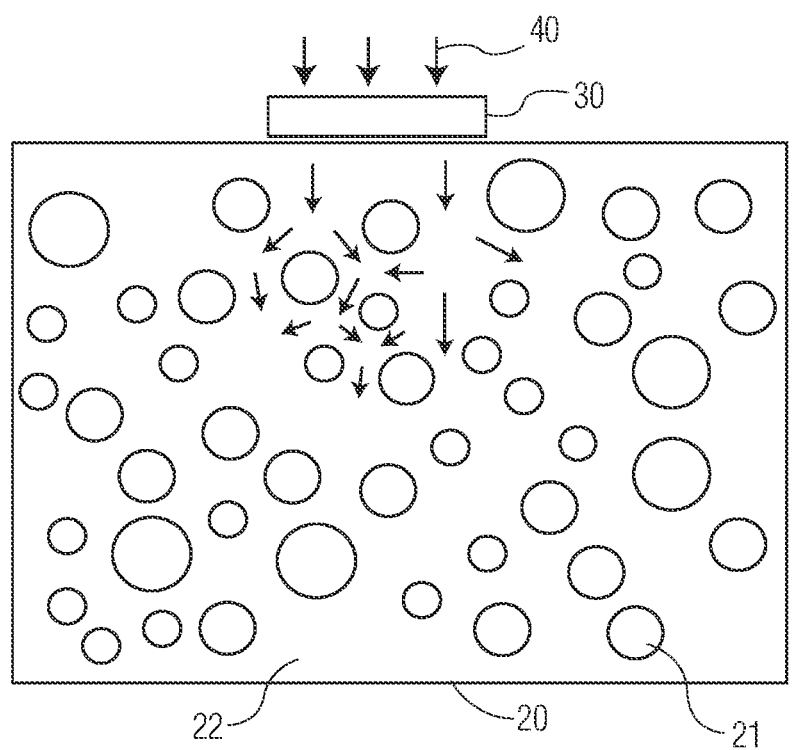
FIG. 3 is a diagram illustrating a matrix of a conventional cellular or non-structural filler concrete.

Referring now to FIG. 3, a diagram illustrating a matrix of a conventional cellular or non-structural filler concrete 20 and its mechanics is shown. This type of concrete matrix works differently from the standard concrete 10. As shown in FIG. 3, the cellular or non-structural filler concrete 20 is provided with non-structural fillers or voids 21 and a solid or cementitious structure 22. However, the mechanics of this matrix is more complex. Force vectors 40 from a load are distributed and dispersed in different directions within the cementitious structure 22 and travel around the non-structural fillers or voids 21. The vectors 40 interact with one another to hold up the load. In this matrix, the cementitious structural composition 22 does all the work and is often made of a cement binder, such as Portland cement, pozzolan such as fly-ash, and fine structural filler such as sand. The design of this solid structure 22 enveloping the non-structural fillers or voids is very important in providing compression strength of an economic concrete of this type.

In practical terms, aerated cellular concrete is difficult to cast on a building site as its quality depends very much on external conditions. Environmental factors mean that the attainment of a desired formation of pores, which effect heat-insulating properties, lightness, load-bearing strength, and even overall volume, is not guaranteed.

Recycled glass has been employed for some time as a concrete aggregate. For this purpose, recycled glass is crushed so as to form glass-making sand. However, this poses its own challenges, including the risks of an alkali-silicate reaction. Recycled lass is an endangered aggregate and can react with the alkalis dissolved in the pore water of the concrete. This reaction results in voluminous reaction products which can lead to internal stresses and cracks and to the destruction of the concrete texture. In addition, recycled glass may contain materials that are very different from glass, such as lids (e.g., aluminum and lead) and labels, as they are crushed with the glass and can lead to additional problems. In addition, the bond between the cement matrix and the smooth surface of the glass grains is rather weak and that the use of glass can make later recycling of the concrete difficult. For these reasons, the use of glass as a sand substitute in constructional concrete is typically advised against.

However, the use of recycled glass in glass manufacturing reduces energy consumption, raw materials use, and tear on machinery. However, not all used glass can be recycled into new product because of impurity, cost, or mixed colors. It is reported that the quantity of mixed waste glass has outstripped the quantity of color sorted glass. There is a need to develop applications for mixed waste glass. Use of recycled materials in construction applications is one of the most attractive options because of the large quantity, low quality requirements, and widespread sites of construction.

Therefore it may be desirable to create a flowable, setting compound with, in comparison with the state of the art, relevantly better and predeterminable properties with respect to weight per unit volume, compressive strength and/or thermal conductance. In particular, a constructional concrete with granulated lightweight aggregates is to be proposed that is suitable for building construction and civil engineering and capable of being cast on the building site in a formwork as cast-in-place concrete. Waste products or recycled primary material are envisioned for use as the lightweight aggregates.

In an example, a lightweight concrete mixture may be formed by incorporating lightweight aggregates (LWA) into a mixture of white/grey calcium sulfoaluminate (CSA) cement, a specialized grout, and water. The mixture may be poured over a rebar (e.g., fiberglass) support structure, allowed to cure, and then strengthened with a densifier. The LWA may be any type of light-weight aggregate material, preferably made from recycled plastic and/or glass.

In an example, the LWA may include recycled plastics. The recycled plastics may come from any source and may include at least one or more plastic materials, such as polyethylene terephthalate (PET), high density polyethylene (HDPE), (poly) vinyl chloride (PVC), low density polyethylene (LDPE), polypropylene (PP), polystyrene (PS) and aluminized plastic. For, example, polyethylene terephthalate (PET) bottles may be used. The waste PET bottles may have a thickness of approximately 1 mm to approximately 1.5 mm. The bottles may be washed to remove impurities and may be ground down (e.g., using a blade mill) to produce a lightweight aggregate ranging in particle size from approximately 5 mm to approximately 80 mm, although different sizes are contemplated. In another example, waste plastics may be ground with a mill for plastics with a sieve allowing the passage of particles from about 5 mm to about 50 mm. The ground waste plastics may be mixed in specific ratios, melted or extruded, molded and/or cut and then cooled.

In other example, the LWA may include lightweight-foamed glass aggregates (FG-LWA). The FG-LWA may be an inert, stable, and environmentally friendly-substrate. To form FG-LWA, recycled glass may be cleaned, ground, mixed with a foaming agent, heated, and allowed to fragment from temperature shock. The resulting aggregate may be cellular, with a relatively low bulk density, but relatively high durability. FG-LWA may have many uses, for example, as a lightweight fill for construction applications, vehicle arrestor beds, building insulation, etc. However, since FG-LWA provides an important economic driver for glass recycling, finding new uses and applications for FG-LWA may be extremely desirable. FG-LWA may be chemically inert. Moreover, FG-LWA may be extremely stable, as it does not degrade, and may be temperature stable to 800° C. The incorporation of FG-LWA into concrete may provide significant heat insulation.

Suitable FG-LWA may be procured from AERO AGGREGATES, LLC, Eddystone, Pa. The FG-LWA may be prepared from a recycled glass cullet. The FG-LWA may be prepared from a sodo-calic glass. As FG-LWA is made up of silica, it may be considered a natural material for regulatory purposes. As FG-LWA is made from recycled glass, it may be considered environmentally friendly. FG-LWA properties include low unit weight, low thermal conductivity, high strength, non-absorbent, non-toxic, non-leachable, chemically stable, impervious to UV degradation, freeze/thaw stable, and fireproof. The FG-LWA may be prepared from recycled glass cullet that contains less than 1% borosilicate glass.

In an example, the FG-LWA may have a particle size of about 5 mm to about 80 mm. In another example, the FG-LWA may have a particle size of about 10 mm to about 60 mm. The FG-LWA may have a bulk density of about 120 $kg/m^3$ to about 400 $kg/m^3$. In another example, the FG-LWA may have a bulk density of about 200 $kg/m^3$ to about 240 $kg/m^3$.

The FG-LWA may be formed using recycled glass cullet. In one example, the recycled glass cullet may be cleaned, ground to less than approximately 150 micrometers (US Standard sieve size No. 100), mixed with a foaming agent (e.g., a carbonate foaming agent) in a pug mill, heated, and allowed to fragment from temperature shock. The rate of cooling may be related to the final particle size (e.g., rapid cooling leads to a relatively finer particle size distribution). The resulting FG-LWA may be cellular/vesicular. After sample preparation, the initial moisture content may be measured following ASTM D2216 (2010), grain size distributions may be determined following ASTM C136/136M (2006), and the initial bulk density may be measured following ASTM C127 (2012a) on the FG-LWA. The average moisture content may be approximately 1.06% and the average bulk density may be approximately 227.2 kg/m3 (14.2 pcf). Sieve analyses may be performed following the dry sieving method on the FG-LWA. Particle size may range from approximately 10 to 30 mm (0.39 to 1.18 in) and the FG-LWA may be a very uniformly graded material.

In another example, the recycled glass cullet may be cleaned, ground, mixed with a foaming agent, heated, and allowed to fragment from temperature shock. The resulting FG-LWA may be cellular/vesicular (foaming creates a thin wall of glass around each gas bubble). By volume, FG-LWA may be approximately 92% gas bubbles and 8% glass. The water content (per ASTM D 2216) of FG-LWA may change with time due to the cellular nature of the material as the exterior ruptured pores are filled with water. The water content may vary from approximately 2% (when contacting water) to approximately 38% after being completely submerged for several days.

The FG-LWA may replace standard lightweight aggregates (e.g., shale and pumice) as the FG-LWA may be approximately 85% lighter than other standards materials. For example, the FG-LWA may be ⅓ the weight of shale and ½ the weight of pumice. The use of FG-LWA in a settable casting compound may not only lower the weight per unit volume, but by virtue of the surface structure of the FG-LWA, which exhibits a multitude of pores that have been broken open, the bond between the CSA cement and the FG-LWA may be very strong. For example, the bond may be greater than between gravel aggregate and cement. This excellent bond enables a high compressive strength and a better tensile bending strength in comparison with normal heavy concrete.

In addition, because of the closed-pore structure of the FG-LWA, the aggregate particles may remain dry in their interior and the pores may remain filled with gas. The FG-LWA may be embedded in a wet mortar without the pore content being diminished as a result. Since FG-LWA is inert, any reaction upon contact of the lightweight aggregate with other substances (e.g. acids and oils) is not a concern and the alkalinity of the concrete may not be affected. Because of the closed cells, the insulating properties of the FG-LWA may remain unchanged, even in a wet environment.

Unlike conventional lightweight concretes, even those that use foam glass, the present formulation may mix the LWA with white/grey CSA cement instead of Portland cement. Portland cement requires kiln temperatures of around 1500° C., whereas CSA cement require only around 1250° C. The CSA clinker is softer than OPC clinker, requiring less energy at the mill to grind it and significantly lower energy to turn through the kiln. A major advantage of using CSA cement is the ability to produce zero shrinkage or very low shrinkage materials. When in contact with water, CSA cement immediately begins to produce ettringite, a mineral that fills the pores of the cement matrix. This makes CSA cement a denser material than Portland cement, contributes to the mix gaining high early strength, and creates a small amount of expansion. This expansion can be controlled and is very stable in the long term.

Another factor that contributes to the strength and very low shrinkage of CSA cement is water demand. Typically ordinary Portland cement requires about 18% water to properly hydrate. The rest of added water is for workability and to allow for handling and installation. CSA cement requires about 35% water to properly hydrate. This high water demand means that there is little extra water needed to make a workable mix, and very little water left in the material after the initial set. This may result in very few voids and, hence, very low shrinkage.

In addition, the CSA cement may result in a more visually appealing product than Portland cement. Cured CSA cement may be very white in color and may be conducive for polishing. In an example, the ratio of CSA cement to LWA may be 60/40 by weight.

The specialized grout may include a blend of one or more types of Portland cement and a blend of one or more polymers and expending agents specially formulated to be used for the grouting of anchor bolts, rebar (e.g., fiberglass and/or conventional steel), pipe, and wooden posts. It may have a fluid consistency and may set rapidly. The specialized grout may be of high strength, have high freeze/thaw resistance, non-shrinking, non-corrosive, and may form strong bonds. In an example, the specialized grout may be free of gypsum and chlorides.

The specialized grout may include one or more ingredients having different purposes. For example, to improve strength and setting time, the specialized grout may include one or more of: one or more types of Portland cement (e.g., Type I, II, and III) and CSA cement. To improve workability and/or flow, the specialized grout may include one or more of: polycarboxylate, polymerized naphthalene sulfate, melamine, and fly ash (e.g., Class C (Pozzolan)). To improve shrinkage control, the specialized grout may include one or more of: a thermoplastic natural resin, barium sulfate, and sulfur oxide. To optimize set time, the specialized grout may include a pH lowering compound (e.g., citric acid). The specialized grout may also include a filler, such as 16×50 silica sand. In an example, the specialized grout may be a fluid and may be added to the mixture in a ratio of 192 fl. oz. per 80 pound bag of CSA cement.

Referring now to Table 1, a chart comparing the characteristics of conventional cement and the lightweight concrete with the specialized grout is shown.

TABLE 1

Characteristics of Lightweight Concrete with Specialized Grout

|  | 1 Hour | 1 Day | 7 Days | 28 Days |
| --- | --- | --- | --- | --- |
| Compressive Strength (ASTM C 109 Modified) | 2,500 psi (17.1 MPa) | 4,000 psi (27.4 MPa) | 6,000 psi (41.1 MPa) | 7,200 psi (49.3 MPa) |
| Tensile Strength (ASTM C 307) |  |  | 350 psi (2.4 MPa) |  |
| 192 fl. oz per 80 lb bag | 1,500 psi (10.3 MPa) | 6,800 psi (46.9 MPa) |  |  |
| Set Time (ASTM C 191) | Initial set is approximately 15 minutes at 70° F. | | | |
| Expansion (ASTM C 157) (ASTM C 827) | 0.35% 0.12% | | | |
| Length Change | +0.0025% | | | |
| Yield | 55 lb bag = 0.42 ft³ Extended with 20 lb of gravel = 0.52 ft³ | | | |
| Chloride Permeability | <1000 Coulombs | | | |

The lightweight concrete may be formed using a conventional mixing process using any type of conventional mixer. The CSA cement may be added to a proper ratio of water in the mixer and gradually mixed in, blending to a smooth consistency. In an example, the volume of water may be approximately 1 quart to every 10 lbs of CSA cement. The ingredients may be mixed for approximately 3 minutes. Once the CSA cement is at the desired consistency, the LWA may be added and blended until the LWA is fully coated and the mixture is at the desired consistency for pouring. In an example, the mixture can be poured into one or more molds to form lightweight concrete blocks.

Figure 4:
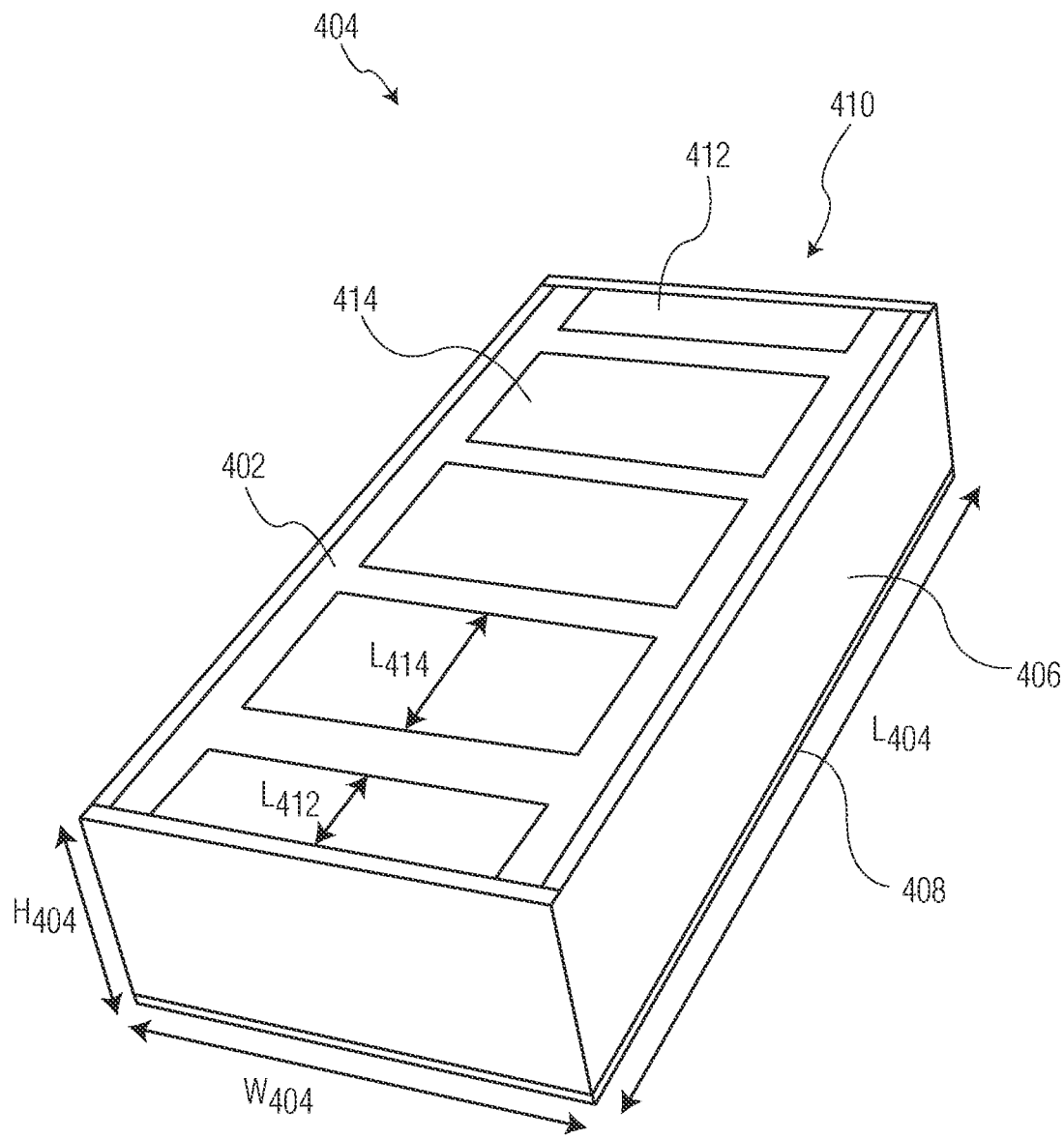
FIG. 4 is a perspective view of a mixture poured into mold.

Referring now to FIG. 4, a perspective view of the mixture 402 poured into a mold 404 is shown. The mixture may be poured directly from the mixer or it may be transported prior to the pouring. One of the advantages of the claimed process is that the pouring may be performed offsite (i.e., the lightweight concrete blocks may be pre-cast) or the pouring may be performed on site. Any shape/size/arrangement may be used for the mold 404. For example, the mold 404 shown in FIG. 4 have a width $W_{404}$×length $L_{404}$×height $H_{404}$ with any of the following: 16"×36"×7.75", 6"×36"×7.75", and 12"×36"×7.75". Any type of conventional material may be used to form the mold 404. For example, the molds may be composed of woods, plastic, foam, composite, metal, etc. In an example, the mold may be formed from melamine panels.

In general, the mold 404 may include outer walls 406 and a bottom 408. Although the mold 404 in FIG. 4 are shown with four outer walls 406, any number of outer walls 406 may be used (e.g., to form corner blocks). In an example, the outer walls 406 may configured to be assembled prior to the pouring and then disassembled after the pouring and the mixture 402 is cured to assist in releasing the cured lightweight concrete block. The bottom 408 may be substantially flat or may have one or more features (not shown) to impart a shape into the lightweight concrete block.

The mold 404 may also include one or more forms 410 that result in one or more openings within the lightweight concrete block. The one or more forms 410 may be composed of a material that is easy to remove once the mixture 402 cures. In an example, the one or more forms 410 may be a foam, such as polystyrene. The one or more forms 410 may include one or more outer forms 412 and one or more inner forms 414. The one or more outer forms 412 may be adjacent and/or in contact with a portion of the one or more of the outer walls 406. The one or more inner forms 414 may be separated from one another by a first distance, separated from the one or more outer forms 412 by a second distance, and separated from the one or more outer walls 406 walls by a third distance. In an example, the first distance, second distance, and third distance may be equal. In another example, one or more of the first distance, second distance, and third distance may be different.

The one or more outer forms 412 may have a different shape than the one or more inner forms 414. For example, the one or more outer forms 412 may have a length $L_{412}$ that is approximately half a length $L_{414}$ of the one or more inner forms 414. It should be noted that, a ratio of the length $L_{412}$ to the length $L_{412}$ may be any number depending on the desired shape of the lightweight concrete block. Likewise, the one or more outer forms 412 and the one or more inner forms 414 may have any height perpendicular to the respective widths. A ratio of a height of the one or more outer forms 412 to a height of the one or more inner forms 414 may be any number depending on the desired shape of the lightweight concrete block.

FIG. 4 shows an example of the mold 404 that has two outer forms 412 and three inner forms 414. It should be noted that this configuration is exemplary, and any number of the one or more outer forms 412 and any number of the one or more inner forms 414 may be used.

Figure 5:
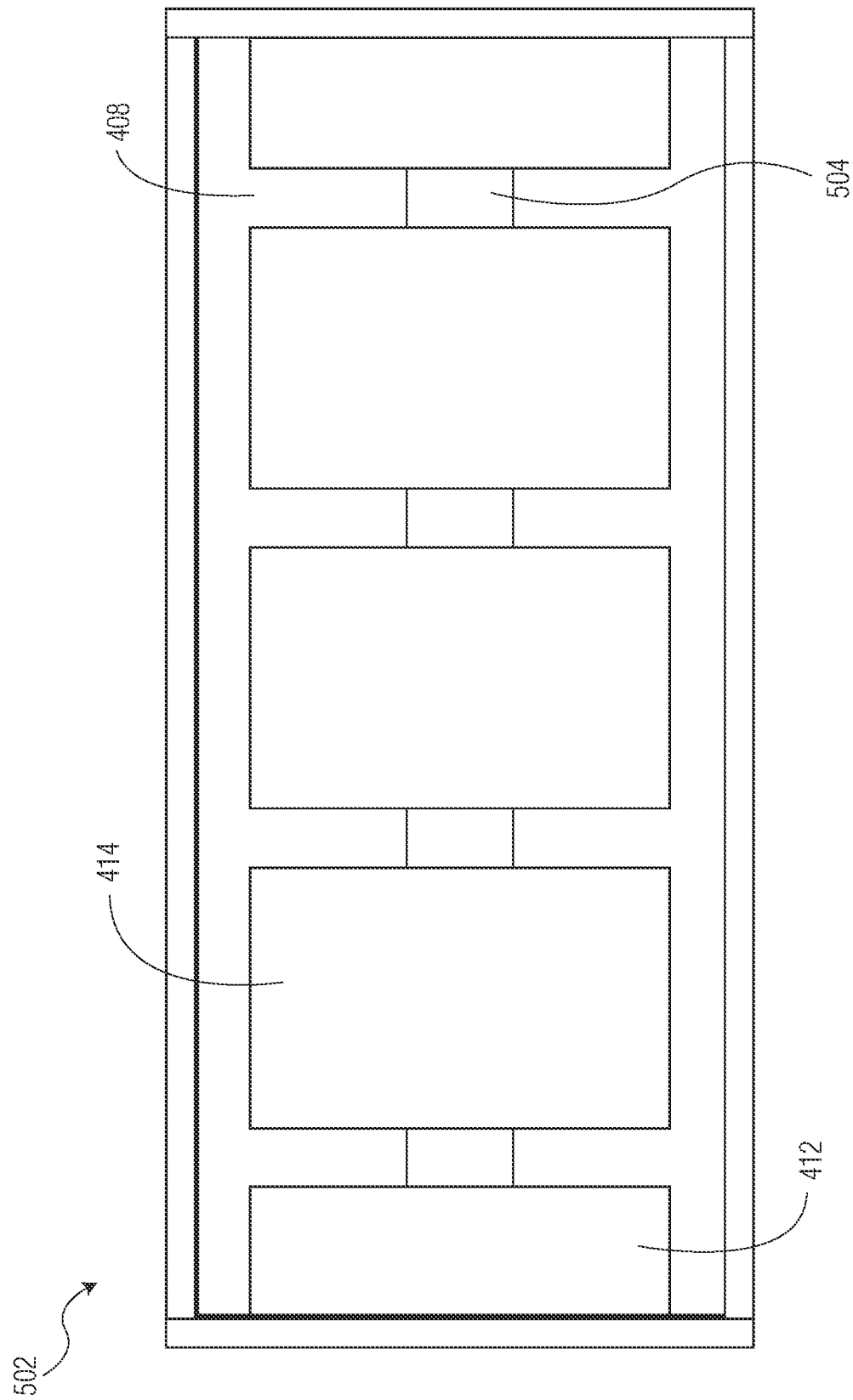
FIG. 5 is a top view of a first exemplary mold.

Referring now to FIG. 5, a top view of a first exemplary mold 502 is shown. FIG. 5 shows one or more features 504 between the one or more outer forms 412 and the one or more inner forms 414. As described above, the one or more features 504 may impart a shape into the lightweight concrete blocks. In an example, the one or more features 504 may extend between each of the one or more outer forms 412 and the one or more inner forms 414. In another example, the one or more features 504 may extend only between a portion of the one or more outer forms 412 and the one or more inner forms 414. The one or more features 504 may be composed of similar material as the one or more outer forms 412 and the one or more inner forms 414.

In an example, the one more features 504 may be elevated from the bottom 408 of the first mold 502, such that the mixture 402 may flow between the one more features 504 and the bottom 408 of the first mold 502. This may result in shapes formed through an interior of the lightweight concrete block. In another example, the one or more the one more features 504 may be flush with the bottom 408 of the first mold 502, such that the mixture 402 cannot flow between the one more features 504 and the bottom 408 of the first mold 502. This may result in shapes formed on a top or bottom of the lightweight concrete block.

Figure 6:
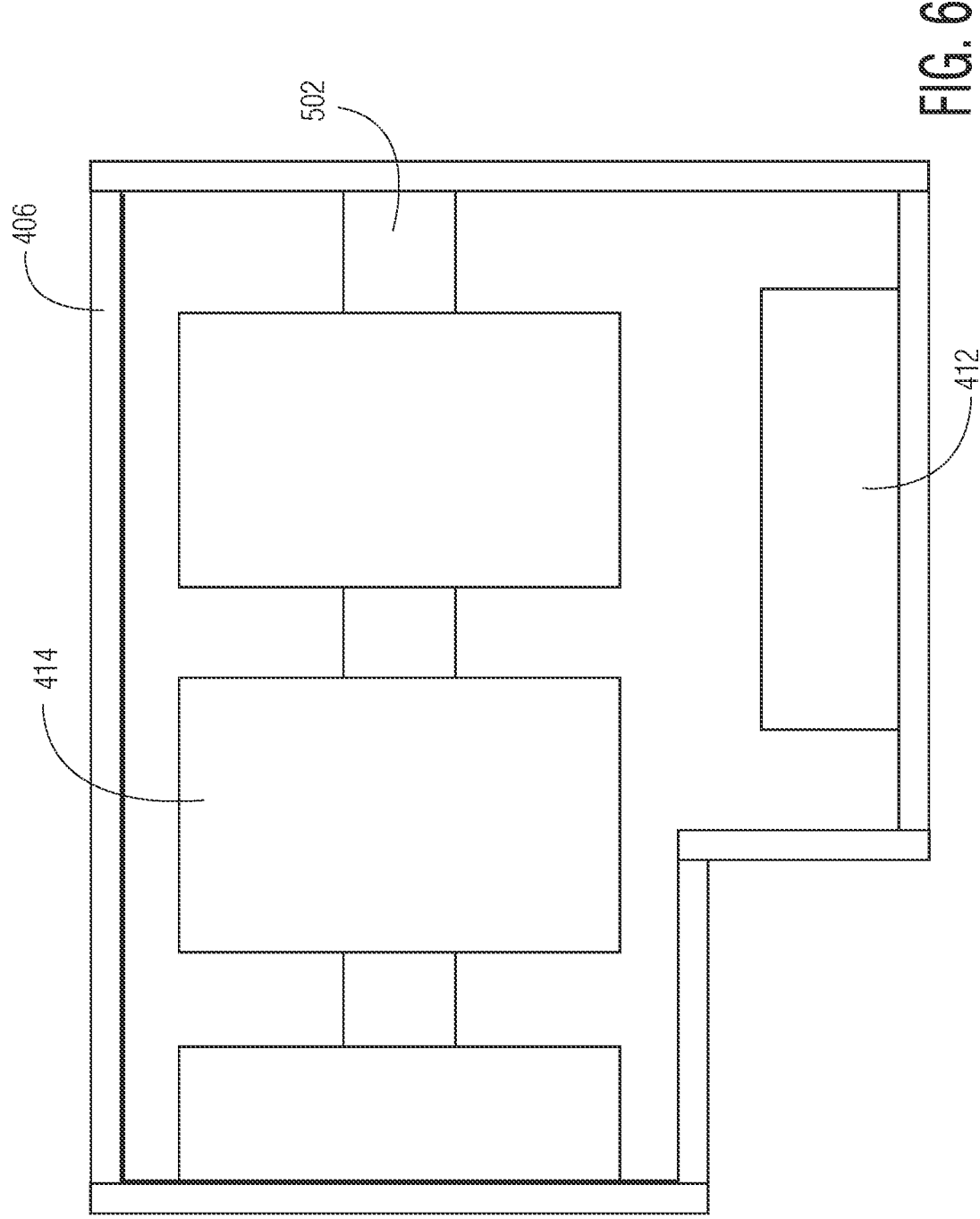
FIG. 6 is a top view of a second exemplary mold.

Referring now to FIG. 6, a top view of a second exemplary mold 602 is shown. The second mold 602 includes six outer walls 402 and the one or more features 504 between the one or more outer forms 412 and the one or more inner forms 414. In an example. the second mold 602 may be used to form a lightweight concrete block for a corner of a wall. As shown in FIG. 6, the one or more outer forms 412 do not necessary have to be linear with the one or more inner forms 414. In addition, the one or more features 504 may be located between one or more of the outer walls 406 and the one or more inner forms 414.

The mixture 402 may be poured into the mold 404 and leveled off until it is substantially level with an upper surface of the outer walls 406, the one or more outer forms 412, and the one or more inner forms 414. The mixture 402 may be allowed to cure in the mold 404 for an appropriate time based on the size and shape of the mold. For example, the mixture 402 may be allowed to set for approximately 15 minutes at approximately 70° F. It should be noted that, unlike conventional lightweight concretes, no foaming agent is required.

After the mixture 402 has fully cured to form the lightweight concrete block, it may be removed from the mold 402. This may be done, for example, by disassembling the outer walls 406. In addition, the one or more forms 410 may be removed by any conventional process (e.g., manually, or through an elevated temperature process.

In an example, a concrete densifier may be applied to the lightweight concrete block. The concrete densifier may be a lithium based concrete densifier, such as the Formula One™ Lithium Densifier MP sold by SCOFILED®. The concrete densifier may be a penetrating semi-transparent to transparent liquid that reacts with concrete to improve abrasion resistance, gloss retention, surface compressive strength, and dusting. The concrete densifier may react with the mixture to form lithium silicate. The concrete densifier may be applied such that it saturates the cured mixture and penetrates into the lightweight concrete. After it is applied, the concrete densifier may be moved around, for example by a broom, and agitated for approximately 30 minutes. After the period of agitation, the concrete densifier may be allowed to dry and set for approximately 6 hours.

In conventional techniques, a densifier may be applied to concrete in a volume such that it penetrates approximately $\frac{1}{16}^{th}$ of an inch. In an example, the densifier may penetrate the lightweight concreate to a depth greater than approximately 3 inches. In some examples, the concrete densifier may penetrate through an entire thickness of the lightweight concrete. This may result in a more robust and aesthetically pleasing final product. After the concrete densifier has dried, it may be optionally polished with one or more ceramic discs. In an example, the concrete densifier may be polished with a 400 grit ceramic disc.

The densified lightweight concrete may be 50% lighter than conventional concrete and may have a compressive strength greater than 5,000 psi. It may have an R factor of 10 and may be fireproof, mold-resistant, and non-water intrusive. Because of these properties, it may be used for structural and/or architectural purposes in both interior and exterior settings.

The lightweight concrete block may be much stronger (e.g., 2.5 times) and lighter (e.g., 42%) than conventional concrete blocks. In an example, the lightweight concrete block may have a length of approximately 36 inches, which is the length of two conventional concrete blocks. As described in detail below, the lightweight concrete block may have handles built into the sides. The lightweight concrete blocks may also have one or more vertical holes that align when the lightweight concrete blocks are stacked, allowing for the filling of one or more desired materials. The lightweight concrete blocks may also have one or more horizontal holes that allow for the insertion of rebar.

Figure 7:
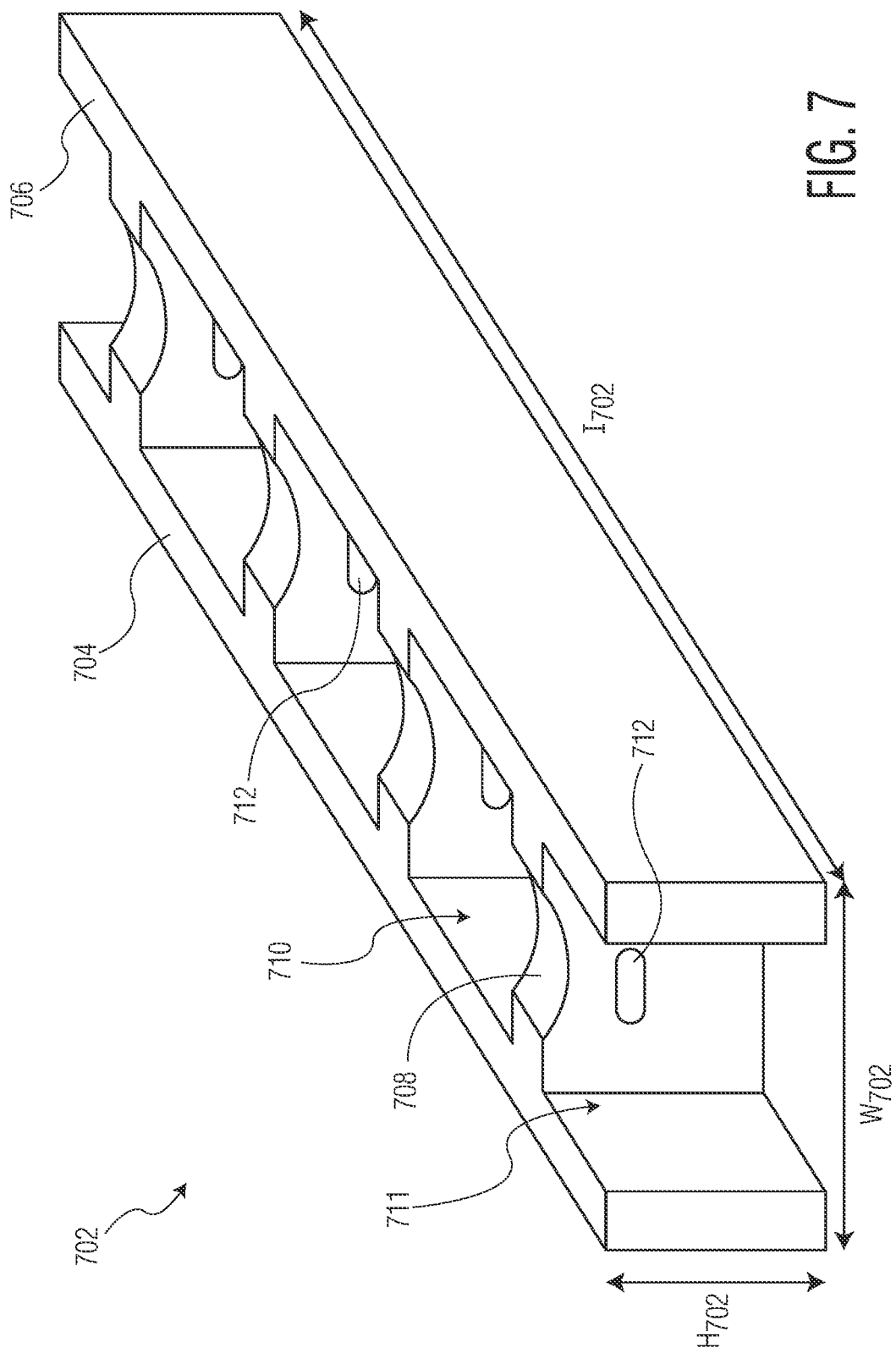
FIG. 7 is a perspective diagram of an example lightweight concrete block.
Figure 8:
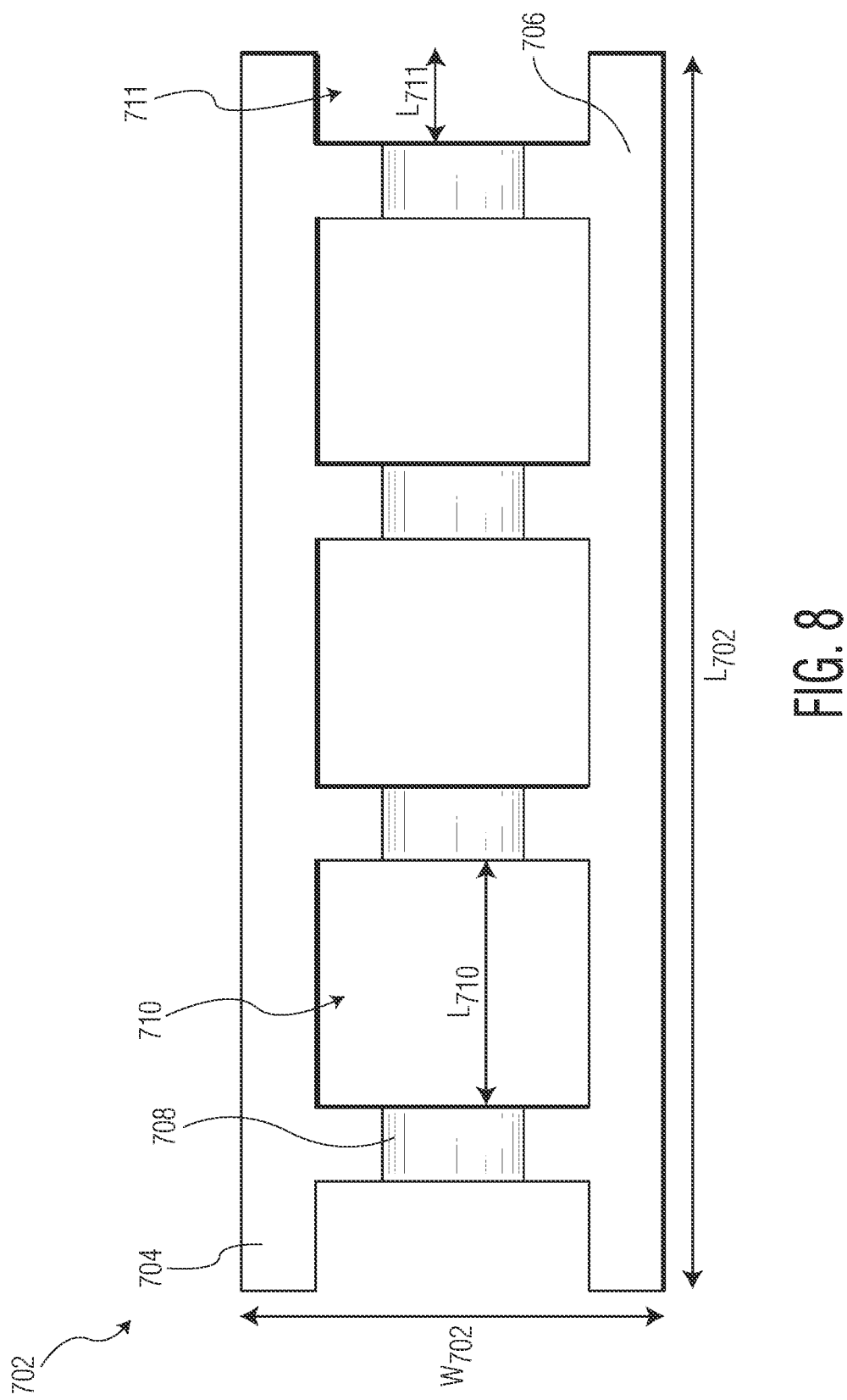
FIG. 8 is an overhead diagram of the example lightweight concrete block.

Referring now to FIGS. 7 and 8, a perspective diagram and an overhead diagram of an example lightweight concrete block 702 is shown. The lightweight concrete block 702 may be substantially rectangular in shape. In an example, it may have a length 1702 of approximately 36", a width $w_{702}$ of approximately 12", and a height $h_{702}$ of approximately 7.75". It should be noted that these dimensions are provided as an example, and the lightweight concrete block 702 may be of any desired size and shape.

The lightweight concrete block 702 may include a first side 704 and a second side 706 joined by a plurality of interposing walls 708. The interposing walls 708 may define a plurality chambers or cavities that significantly reduce the amount of cement required per lightweight concrete block 702 compared to a solid block that does not have such cavities. In addition, these cavities provide a means for adding structural strength to a stacked arrangement of the lightweight concrete block 702. The cavities may allow for placement of rebar or other structural material vertically along the height of the lightweight concrete block 702 during stacking. It should be noted that although FIGS. 7 and 8 show a total of five (5) cavities, three internal cavities 710 and two external cavities 711, any number and shape of cavities is contemplated.

As described above, one or more of the interposing walls 708 may include one or more shapes formed from the one or more features 504. The one or more shapes may include an indentation 713 on an exterior portion of the interposing wall 708. The indentation 713 may allow for a placement of rebar or other structural material on the one or more of the interposing walls 708 along the length of the lightweight concrete block 702. The one or more shapes may also include a hole 712 though an interior of the interposing wall 708. The hole 712 may be used as a handle and/or may allow for the insertion of rebar or other structural material along the length of the lightweight concrete block 702.

Referring now to FIG. 8, an overhead diagram of an example lightweight concrete block 702 is shown. The internal cavities 710 may have a length $L_{710}$ that is equivalent to the length $L_{414}$ of the one or more inner forms 414. The external cavities 711 may have a length $L_{711}$ that is equivalent to the length $L_{412}$ of the one or more outer forms 412. The lateral dimensions of the interposing wall 708 may be equivalent to the first distance separating the one or more inner forms 414 from one another and/or the second distance separating the one or more inner forms 414 from the one or more outer forms 412. The lateral dimensions of the first side 704 and the second side 706 may be equivalent to the third distance separating the one or more inner forms 414 from the one or more exterior walls 406.

The lightweight concrete block 702 may be used to form structural walls. For example, a plurality of lightweight concrete blocks 702, and any other configuration of lightweight concrete block may be place adjacent to one another and stacked vertically to form a wall. The one or more internal cavities 710 and external cavities 711 of the vertically stacked lightweight concrete blocks may be aligned and may form vertical columns in which one or more materials may be added to provide further structural and/or thermal integrity.

In an example, the one or more vertical columns formed may be filled with the mixture 402. This may be done as the lightweight concrete blocks 702 are being stacked (e.g., every few blocks) or after a desired height is reached. The mixture 402 may be allowed to cure and harden. The resulting wall may be insulating and have a strength that is equal to or above conventional cast in place steel re-enforced concrete buildings. The wall may have a compressive strength of approximately 5000 psi (e.g., equal to a 12 inch insulated concrete pour).

In another example, the one or more vertical columns formed may be filled with the LWA to provide lightweight thermal insulation.

In yet another example, the one or more vertical columns may be filled with a high strength grout mix. In an example, the high strength grout mix may have a compressive strength of approximately 10 k-12 k psi. The high strength grout mix may be composed of Portland cement and conventional aggregates and may be formed by a conventional mixing process. In an example, the high strength grout mix may be poured into the one or more vertical columns and allowed to cure each time the lightweight concrete blocks 702 are stacked four (4) courses high. The resulting wall may be insulating, may have a compressive strength of over 10 k psi (e.g., blast and bomb proof), and may be 65-70% lighter than conventional high strength walls.

Additionally or alternatively, the wall may be secured/reinforced by one or more structural components that run vertically and/or horizontally through one or more of the lightweight concrete blocks 702.

Figure 9:
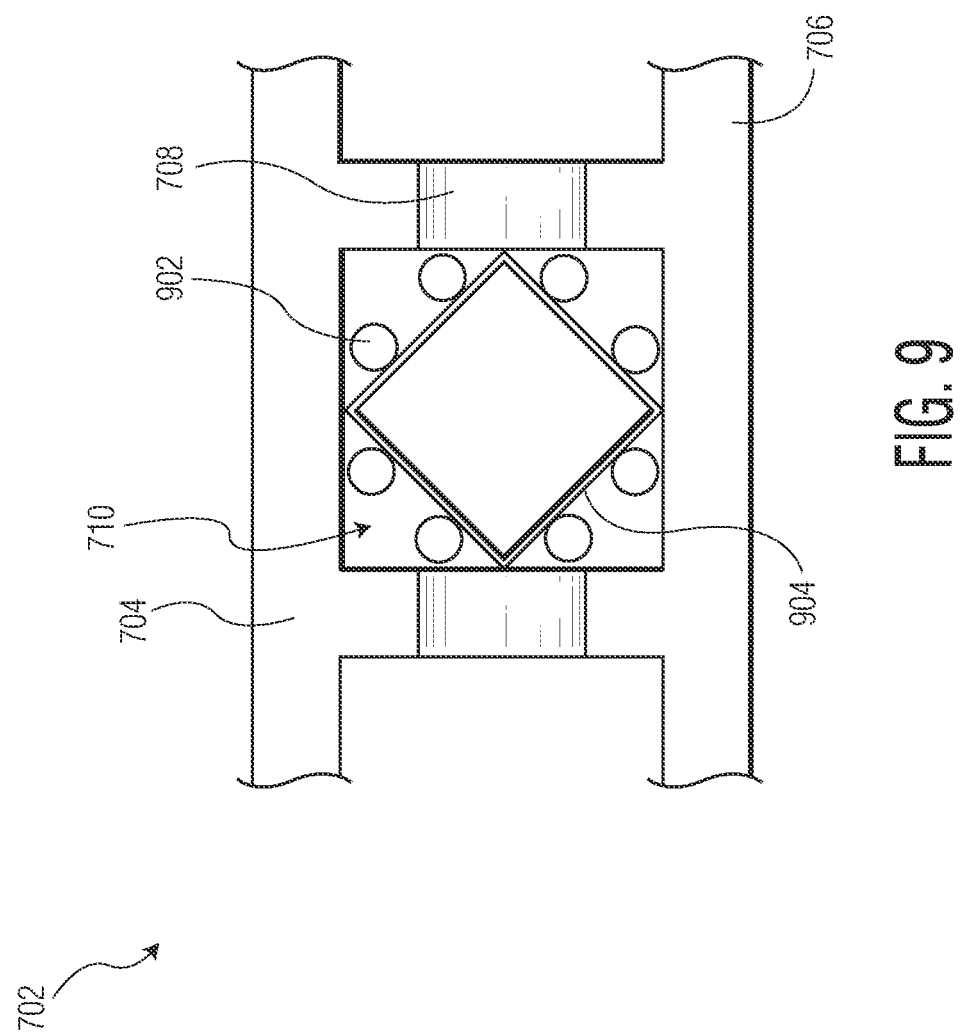
FIG. 9 is an overhead view of the lightweight concrete block with one or more pieces of rebar extending vertically through a cavity.

Referring now to FIG. 9, an overhead view of the lightweight concrete block 702 with one or more pieces of rebar 902 extending vertically through an internal cavity 710 is shown. Any type of rebar or structural material may be used for the rebar 902. In an example, the rebar 902 may be conventional metal rebar. In another example, the rebar 902 may be composed of fiberglass. The fiberglass rebar may be made from a lightweight polymer and may provide structural support. It may be twice as strong as steel while being 5 times lighter, and may be recyclable. The fiberglass rebar may be made of individual rods that may range from approximately ¼" to 1" in diameter. The fiberglass rebar may be formed to fit different shapes of all structural applications with the spacing between the individual rods of the fiberglass rebar dictated by the application.

Any configuration of rebar 902 may be used. FIG. 9 illustrates an example in which eight (8) individual pieces of rebar 902 may be arranged in an internal cavity 710 and supported by a crossmember 904. The crossmember 904 may also be made of the rebar 902. In another example, four (4) pieces of rebar 902 may be inserted vertically in each corner of the one or more internal cavities 710. In another example, multiple pieces of rebar 902 (e.g., 2, 3, 4, etc.) may be bound together to form a group of rods. The multiple pieces of rebar 902 may be bound together and/or joined to other pieces of rebar 902 using one or more of a tie and/or a slip coupling.

Figure 10:
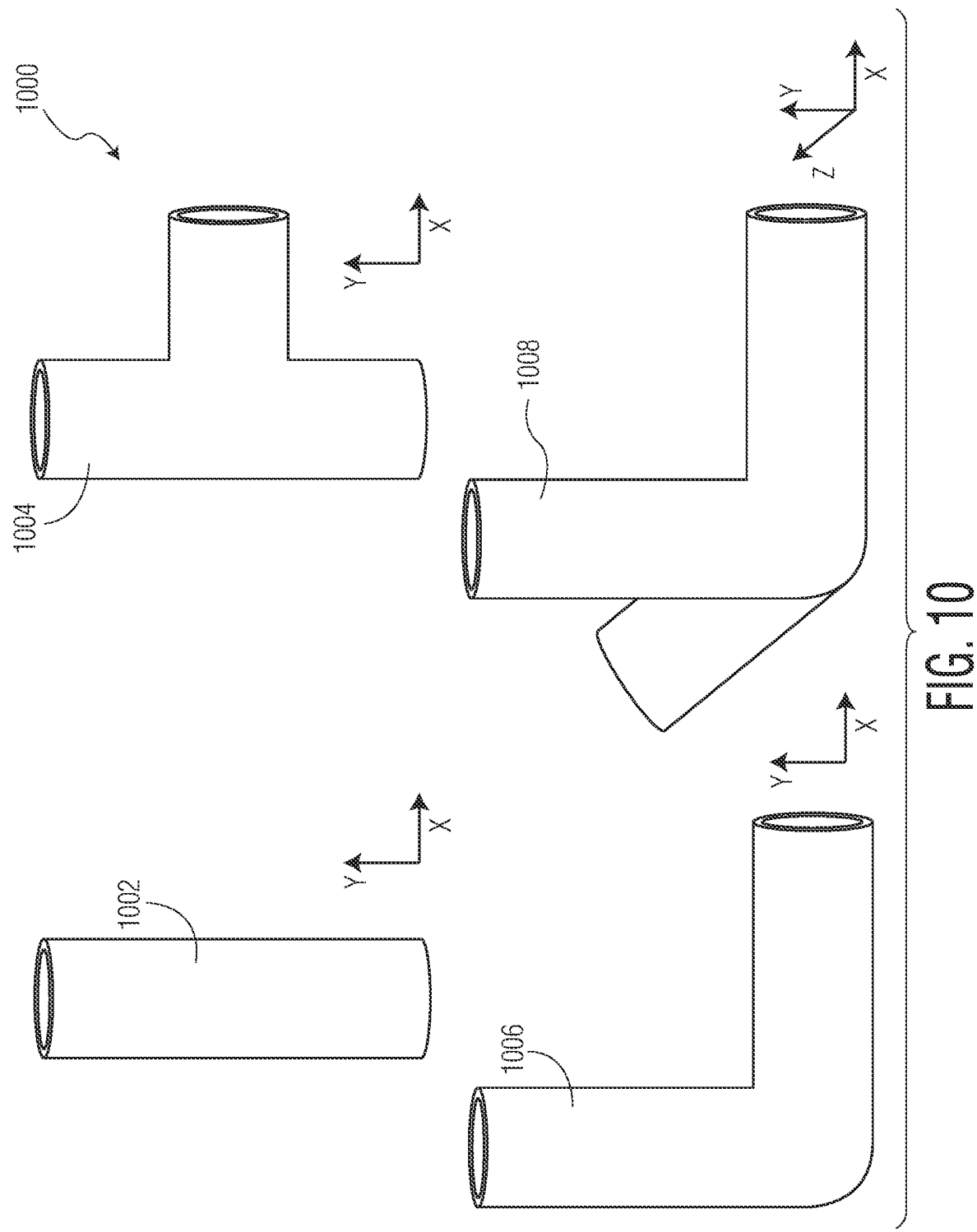
FIG. 10 is a diagram illustrating examples of slip couplings that may be used to join pieces of rebar.

Referring now to FIG. 10, a diagram illustrating examples of slip couplings 1000 that may be used to join the pieces of rebar 902 is shown. Each of the slip couplings 1000 may be approximately 2 inches long in each direction from a center point. The slip couplings 1000 may have openings with a diameter that is slightly larger (e.g., approximately $\frac{1}{16}^{th}$ of an inch) than a diameter of the rebar 902 to ensure a tight fight when the rebar 902 is inserted. The slip couplings 1000 may be made out of a material similar to that of the rebar 902. A first slip coupling 1002 may have two openings aligned on the same y axis. A second slip coupling 1004 may have two openings aligned on the same y axis and a third opening on an x axis. A third slip coupling 1006 may have a first opening on a y axis and second opening on an x axis. A fourth slip coupling 1008 may have a first opening on a y axis, a second opening on an x axis, and a third opening on a z axis Each of the one or more internal cavities 710 and external cavities 711 of the lightweight concrete block 702 may include vertical rebar 802. In another example, only a portion of the one or more internal cavities 710 and external cavities 711 may contain rebar 902. The rebar 902 may extend vertically past the height $h_{702}$ of the lightweight concrete block 702. In addition, one or more pieces of rebar 902 may extend horizontally along the length of the block through the one or more holes 712. The horizontal rebar 902 may extend beyond the length 1702 of the lightweight concrete block 702 (e.g., 4 inches past the block). During stacking, the vertical rebar 902 may extend into one or more internal cavities 710 and external cavities 711 of an adjacent lightweight concrete block 702 and the horizontal rebar 902 may extend into a one or more holes 712 of an adjacent lightweight concrete block 702.

Figure 11:
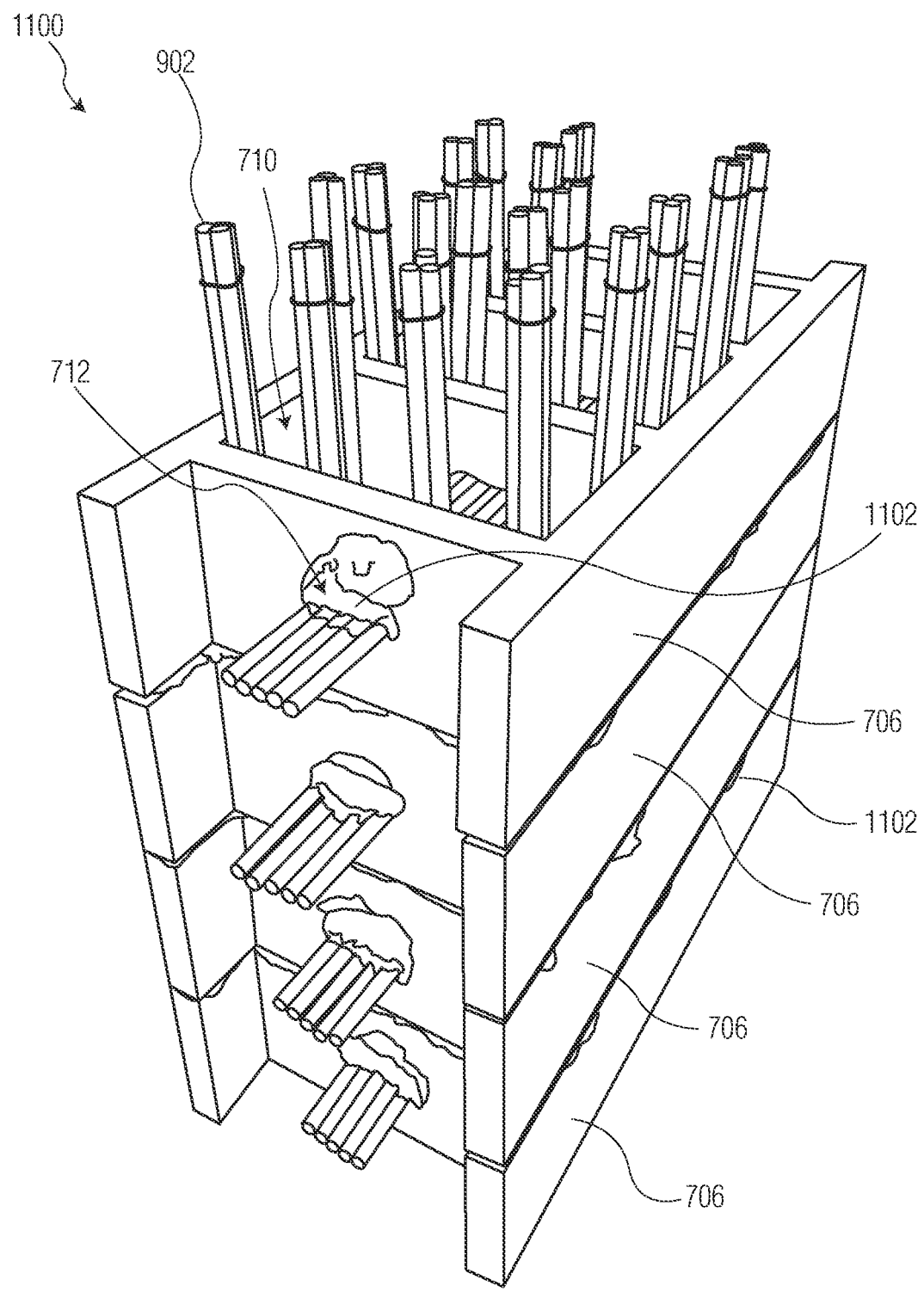
FIG. 11 is a diagram showing multiple lightweight concrete blocks stacked vertically to form a portion of a wall.

Referring now to FIG. 11, a diagram showing multiple lightweight concrete blocks 702 stacked vertically to form a portion of a wall 1100 is shown. A layer of mortar 1102 may be applied between one or more of the lightweight concrete blocks 702. In an example, the mortar 1102 may be a high-strength (e.g., above 5,000 psi) mortar made with CSA cement. In another example, the mortar 1102 may be the mixture 402. As described above, the portion of the wall 1100 may include one or more pieces of rebar 902 arranged vertically in the one or more internal cavities 710 external cavities 711. In addition, the portion of the wall 1100 may include one or more pieces of rebar 902 arranged horizontally through the through the one or more holes 712. In an example, the one or more holes 712 may be sealed with the mortar 1102 to allow for filling of the vertical column.

Figure 12:
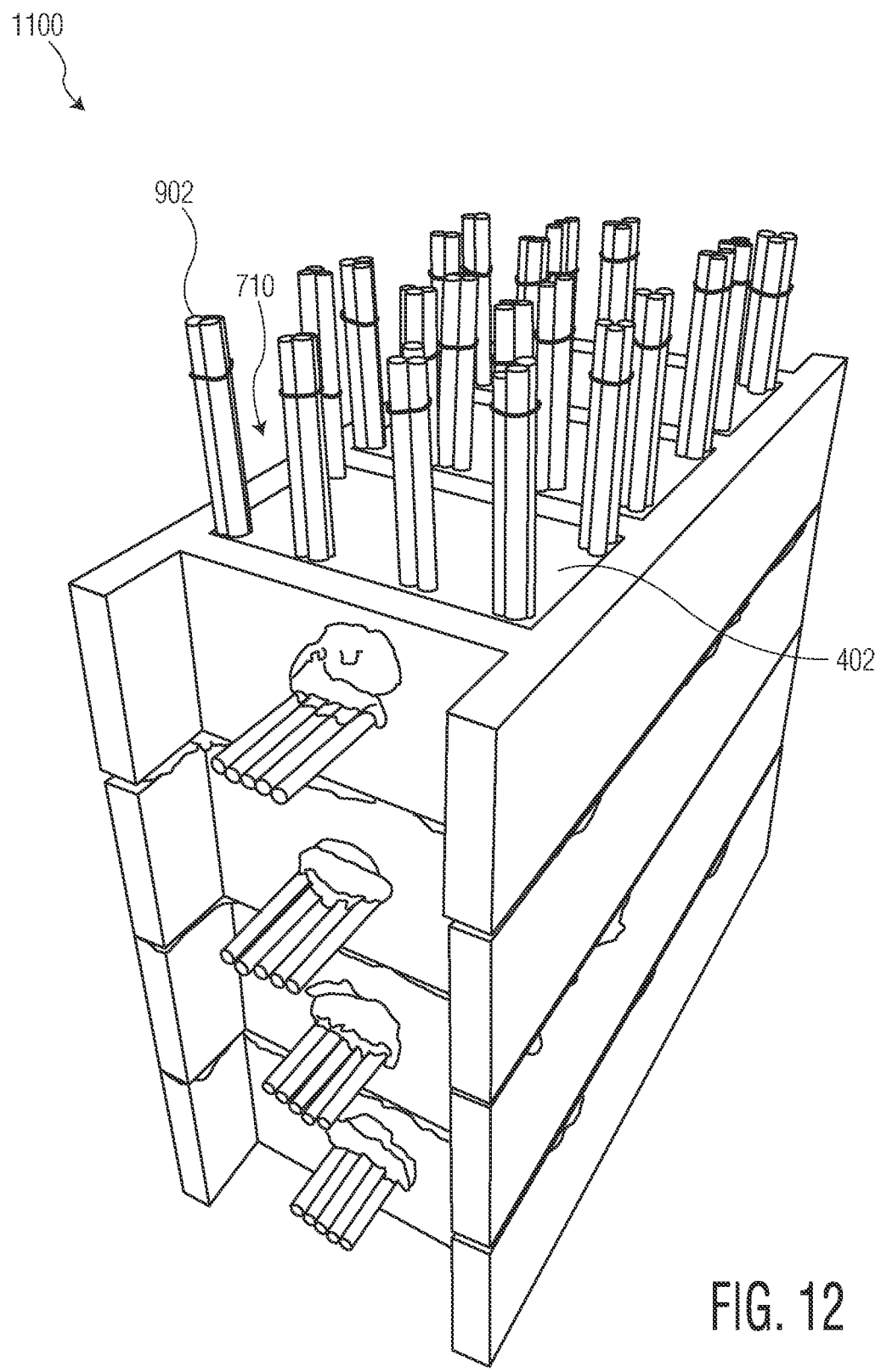
FIG. 12 is a diagram showing the portion of the wall with one or more cavities filled with the mixture.

If the one or more vertical columns are filled with the mixture 402, the rebar 902 may hold the LWA in place during pouring/setting while the cement flows around it, thereby ensuring a uniform distribution of the LWA in one or more the vertical columns. FIG. 12 is a diagram showing the portion of the wall 1100 with the one or more internal cavities 710 filled with the mixture 402.

Although features and elements are described above in particular combinations, one of ordinary skill in the art will appreciate that each feature or element can be used alone or in any combination with the other features and elements.

The invention claimed is:

1. A method of forming a lightweight concrete block comprising:
    adding calcium sulfoaluminate (CSA) cement and specialized grout to an amount of water in a mixer, wherein a ratio of the water to the CSA cement is 1 quart to every 10 lbs of CSA cement;
    blending the CSA cement, specialized grout, and water to a smooth consistency;
    adding lightweight aggregates (LWA) to the blended CSA cement, specialized grout and water to form a mixture, wherein a ratio of the CSA cement to LWA is 60/40 by weight; and
    pouring the mixture into a mold;
    allowing the mixture to cure; and
    removing the cured mixture from the mold.

2. The method of claim 1, wherein the blending is done for approximately 3 minutes.

3. The method of claim 1, wherein the specialized grout comprises one or more of types of Portland cement, polymers, and expending agents.

4. The method of claim 3, wherein the specialized grout further comprises a pH reducing agent.

5. The method of claim 1, wherein the LWA comprises one or more of recycled plastics and lightweight-foamed glass aggregates (FG-LWA).

6. The method of claim 1, wherein the mold comprises:
    a base;
    one or more exterior walls;
    one or more outer forms in contact with a portion of the one or more exterior walls;
    one or more inner forms separated from one another by a first distance, separated from the one or more outer forms by a second distance, and separated from the one or more exterior walls by a third distance; and
    one or more features extending between the one or more inner forms and the one or more outer forms.

7. The method of claim 6, wherein the first distance, second distance, and third distance are equal.

8. The method of claim 6, wherein one or more of the first distance, second distance, and third distance are different.

9. The method of claim 6, wherein the one or more features are in contact with the base.

10. The method of claim 6, wherein the one or more features are separated from the base by a distance.

11. A lightweight concrete block comprising:
    a first side and a second side joined by a plurality of interposing walls, the plurality of interposing walls defining one or more inner cavities and one or more outer cavities;
    wherein the first side, the second side, and the plurality of interposing walls are formed from a lightweight concrete comprising lightweight-foamed glass aggregates (FG-LWA) suspended in a mixture of calcium sulfoaluminate (CSA) cement and specialized grout.

12. The lightweight concrete block of claim 11, wherein the specialized grout comprises one or more of types of Portland cement, polymers, and expending agents.

13. The lightweight concrete block of claim 11, wherein the one or more inner cavities have a length that is approximately twice a length of the one or more outer cavities.

14. The lightweight concrete block of claim 11, wherein the one or more outer cavities are open ended.

15. The lightweight concrete block of claim 11, wherein one or more of the plurality of interposing walls comprise a hole.

16. The lightweight concrete block of claim 11, wherein one or more of the plurality of interposing walls comprises an indentation on an exterior portion.

17. A method of forming a lightweight concrete wall comprising:
    vertically stacking one or more lightweight concrete blocks, the one or more lightweight concrete blocks comprising:
        a first side and a second side joined by a plurality of interposing walls, the interposing walls defining one or more inner cavities and one or more outer cavities,
        wherein the first side, the second side, and the plurality of interposing walls are formed from a lightweight concrete comprising lightweight aggregates (LWA) suspended in a mixture of calcium sulfoaluminate (CSA) cement and specialized grout,
    aligning the one or more inner cavities and one or more outer cavities of each of the one or more lightweight concrete blocks, such that one or more vertical columns are formed;
    inserting fiberglass rebar vertically in at least a portion of the one or more vertical columns;
    inserting fiberglass rebar horizontally through a hole in one or more of the interposing walls of the one or more lightweight concrete blocks; and
    filling the one or more vertical columns with one or more materials.

18. The method of claim 17, wherein the one or more materials comprise one or more of the LWA and the lightweight concrete.

19. The method of claim 17, wherein the one or more materials comprise a high strength grout mix.

* * * * *